Aug. 5, 1969     T. F. SMITH     3,459,922

ELECTRICAL FOOD SERVING UNIT

Filed Nov. 16, 1966     2 Sheets-Sheet 1

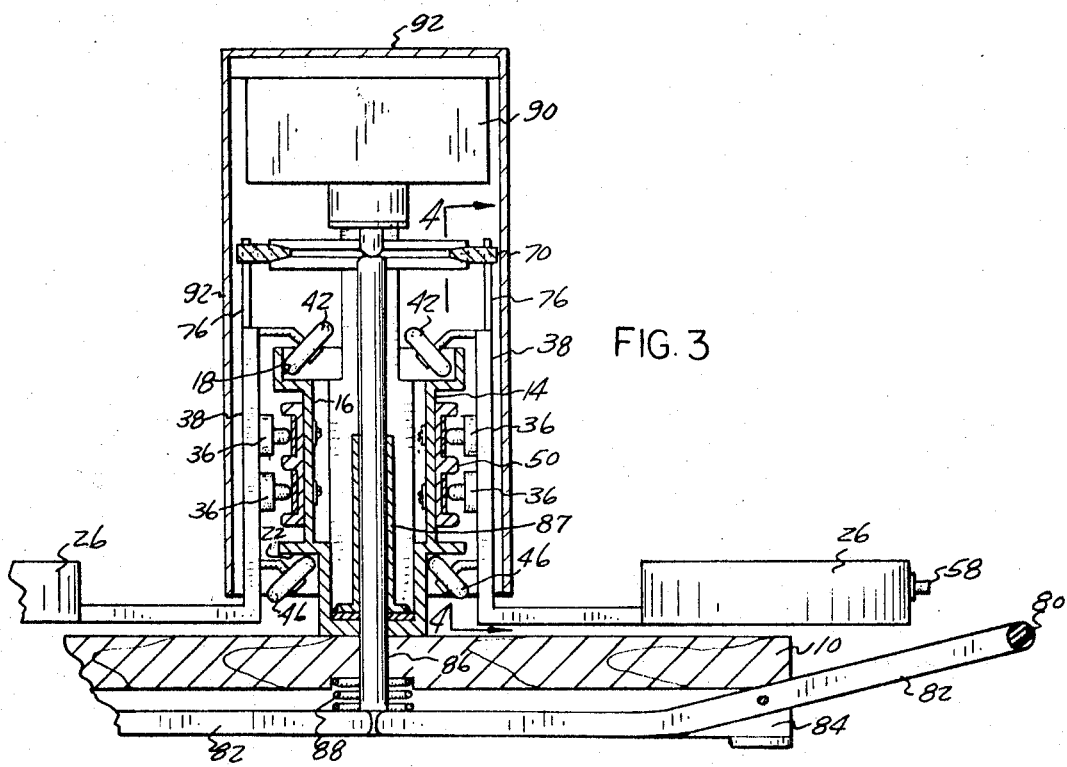
FIG. 3
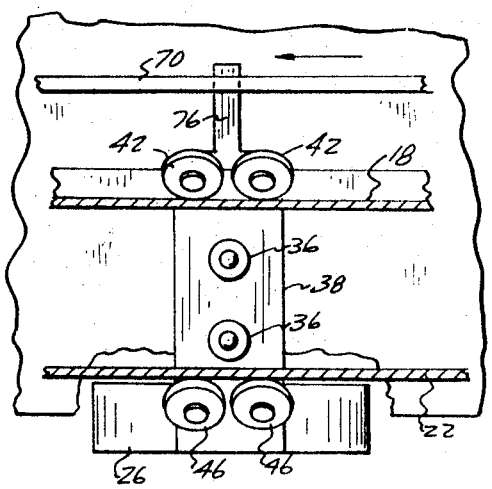
FIG. 4
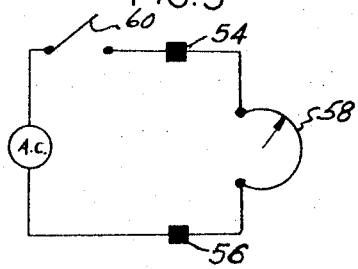
FIG. 5
FIG. 6
INVENTOR
THOMAS F. SMITH
BY Hauke, Krass, & Gifford
ATTORNEYS

United States Patent Office 3,459,922
Patented Aug. 5, 1969

3,459,922
ELECTRICAL FOOD SERVING UNIT
Thomas F. Smith, 19940 Stahelin,
Detroit, Mich. 48219
Filed Nov. 16, 1966, Ser. No. 594,792
Int. Cl. F27d *11/00;* F27b *7/00*
U.S. Cl. 219—433    6 Claims

ABSTRACT OF THE DISCLOSURE

A self-serving food warming apparatus having a plurality of hot plates mounted on a supporting base so as to be movable about a closed horizontal path, and means for moving the hot plates about the path to advance a selected plate to a serving station.

---

This invention relates to food warming apparatus and more specifically to a self-serving apparatus having a plurality of individually heated food serving units supported for motorized movement around a closed track.

Self-serving food warming units employing a table having a rotary top and provided with means for heating a plurality of food servings are often used to provide a meal for a relatively large group of persons. Such an apparatus on a smaller scale is frequently used in the home to serve a meal to a relatively few number of people and have as their purpose the maintenance of foodstuffs in a warmed state for the benefit of the diners. By mounting the heated serving section on a revolving member, a diner can rotate the table to make any selected foodstuff accessible for serving thus obviating the problem of interrupting the conversation and meal of the other diners to have the selected food serving passed from one person to another.

It is the broad purpose of the present invention to improve self-serving food warming units by providing such an apparatus having a plurality of individually heated hot plates which are mounted for horizontal movement around a closed track. An electric motor is drivingly connected through an energizing switch to the hot plates. A peripheral touch bar is operatively connected to the switch and enables a diner to pass each of the hot plates in succession within his access. The improved food warming apparatus has particular utility in the home for serving a few individuals thus relieving the housewife of the chore of continuously delivering food servings from the kitchen to the dining area; and also in commercial establishments providing smorgasbord type of meals. In the latter instance, a large variety of food servings are normally available so that their combined weight renders a conventional revolving food serving table inadequate.

It is therefore the object of the present invention to provide a self-serving food warming apparatus employing a motor for moving individually heated food servings in succession past a serving station.

It is another object of the present invention to improve motorized food serving tables by providing a peripheral touch bar operatively connected to the driving motor and enabling a diner to selectively displace a selected food serving from a position inaccessible to the diner to an accessible position.

Still another object of the present invention is to provide a self-serving food supporting apparatus having a plurality of foodstuff supporting sections movable about a closed track mounted on a fixed supporting member.

Still further objects and advantages will readily occur to one skilled in the art to which the invention pertains on reference to the following detailed description. The description makes reference of the accompanying drawings in which:

FIG. 3 is a sectional view taken along lines 3—3 of FIG. 1;

FIG. 4 is a sectional view taken along lines 4—4 of FIG. 3;

FIG. 5 is a schematic illustration of the preferred electrical circuit for individually energizing the heating elements; and FIG. 6 is a schematic diagram of the preferred electrical circuit for energizing the motor drive means.

Figure 1:
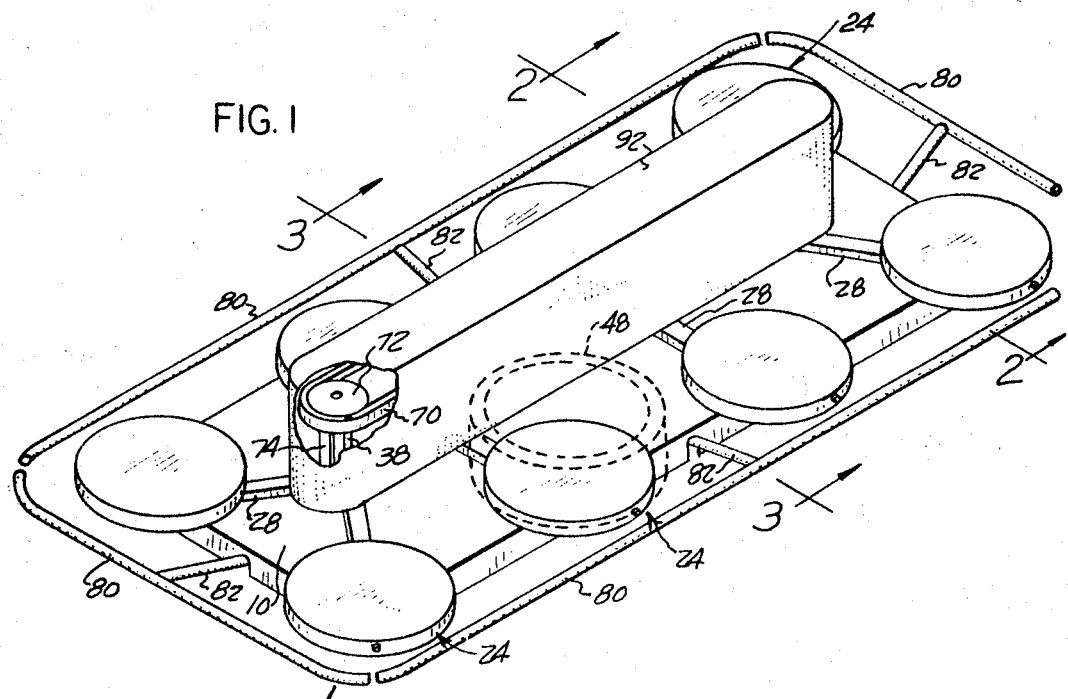
FIG. 1 is a perspective view illustrating a self-serving food warming apparatus embodying the present invention and with parts broken away for purposes of clarity.
Figure 2:
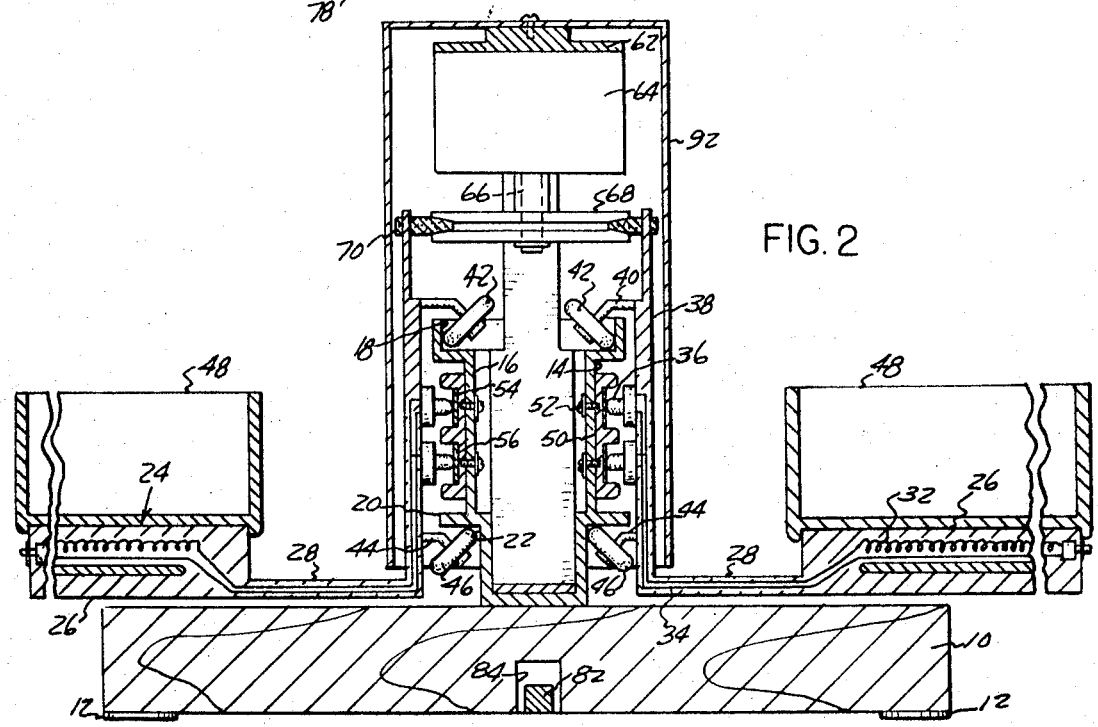
FIG. 2 is a sectional view taken along lines 2—2 of FIG. 1.

Now referring to the drawings, and with particular reference to FIGS. 1 and 2, the preferred embodiment of the food warming apparatus comprises a base 10 preferably formed of wood and having an attractive configuration suited for arranging on the surface of a conventional dining table. The base 10 is illustrated as having a generally rectangular configuration and is provided on its under side with a plurality of spaced non-marring pad elements 12. Pad elements 12 function to prevent the food warming apparatus from scratching or otherwise defacing the surface of the dining table.

A track member 14 is fixed on the longitudinal center line of the base 10. The track 14 has a continuous vertical side wall 16. As can best be seen in FIG. 2, the upper edge of the side wall 16 is directed outwardly and then vertically upwardly to form a continuous peripheral upper guideway 18. Vertically spaced from upper guideway 18, the side wall 16 is provided with an outwardly directed lip 20 to form a continuous lower guideway 22. It can be seen that the upper guideway 18 provides a bearing surface on the inner side of the side wall 16, whereas the lower guideway 22 provides a bearing surface on the outer side of the side wall 16.

A plurality of warming units generally indicated at 24 are individually carried by the upper guideway 18 and the lower guideway 22. Each warming unit 24 comprises an electrically heated warming plate 26 fixed in cantilever relationship to the outer free end of a horizontally directed leg 28 of a bracket 30. The warming plate 26 is preferably made of ceramic and provided with a conventional heating element 32 having insulated electrical wires 34 connected to a pair of electrical contacts 36. The wires 34 extend from the heating element 32 through a hollowed-out section of a warning unit supporting leg 28 and through a hollowed-out section of an inner vertical leg 38 of the bracket 30.

Now referring to FIGS. 2-4, each vertical leg 38 carries a pair of inwardly directed upper, angularly formed pin member 40. A wheel 42 is rotatably mounted on the free end of each of the pins 40 which are downwardly directed such that the wheels 42 ride at an angle of about 45 degrees in the upper guideway 18.

Each vertical bracket leg 38 also carries a lower pair of inwardly directed, spaced pin members 44. A wheel 46 is carried on the free end of each of the pins 44. The wheels 46 also are supported for rotation and ride in the lower guideway 22, preferably at an angle of about 45 degrees with respect to the vertical. Thus, it can be seen that the upper wheel members 42 and the lower wheel members 46 cooperate to transfer the weight of a warming unit 24 and a container of foodstuff 48 supported thereon to the side walls of the track 14. The wheels 42 and 46 also permit the warming units 24 to move in a closed path defined by the configuration of the guideways 18 and 22. Preferably wheel members 42 and 44 are formed of a low friction material such as nylon.

A second track 50 extends completely around the outer face of the side wall 16 and is fastened thereto by a plurality of threaded fasteners 52. The track 50 is formed of a non-electrical conducting material and is disposed between the upper guideway 18 and the lower guideway 22. The track 50 carries a pair of spaced apart electrical current carrying members 54 and 56. The contacts 36 bear against the current carrying members 54 and 56 and slide thereon so that as the food warming unit 24 is moved relative to the track, electrical current is delivered from the members 54 and 56 to heating elements 32.

The heating elements 32 are operatively connected to a switch or control 58, which is carried by the warming plate 26, and is adapted to adjust the intensity of the heat produced by the heating element 32 so that the container of foodstuffs 48 may be maintained at a selected temperature.

As can be seen in FIG. 5, an actuating switch 60 disposed in an energizing circuit provides electrical energy to the current carrying members 54 and 56, while the switches 58 selectively and individually determine the magnitude of the heat to accommodate the contents of the containers 48.

Referring to FIGS. 2 and 4, a generally C-shaped bracket 62 is provided with a lower horizontal arm fixed to the base of the track 14 and with an upper horizontal arm adapted to carry a motor 64. The motor 64 has a downwardly directed output shaft 66, which carries a drive pulley 68 for rotation about a vertical axis. A drive belt 70 is engaged with the pulley 68 at one end of the track 14 and with an idler pulley 72 supporting rotation at the opposite end of the track 14 by a second generally C-shaped bracket 74. Bracket 74 is supported on the base of track 14 and opposes bracket 62.

A finger 76 forms an upper extension of each of the vertical supporting legs 38 and is fixed to the drive belt. Thus, it can be seen that when the motor 64 is energized, the drive belt 70 provides a moving force for each of the warming units 24. As the warming units 24 move in a direction dictated by the rotation output of the motor 64 the pair of upper wheels 42 and the pair of lower wheels 46 riding in their respective tracks function to stabilize the movement of the warming units 24 in addition to providing a quiet and relative friction-free drive.

It is to be understood that the motor 64 is provided with suitable internal gearing, such that the warming units 24 progress at a relatively slow rate thus enabling the diner to view the contents of each of the containers 48, and also at a rate that will accommodate liquid foodstuffs so that spillage does not become a problem.

A peripheral touch bar generally indicated at 78, is sectored into segments 80; each of which is associated with a side of the base 10, and which is provided with an inwardly directed lever arm 82 pinned in a groove 84 provided in the base 10. The inner end of the lever 82 has a length such that it engages a vertically supported push rod 86. Each lever 82 is pivotable about a horizontal axis such that the inner end moves between a lower position and an upper position.

A spring bias member 88 normally urges the inner end of the lever 82 toward its lower position. The push rod 86 is guided for vertical movement by a sleeve 87. The upper end of the push rod 86 engages a normally open switch device 90, which as can be seen in FIG. 6 is disposed in series relationship with motor 64. Thus, by depressing the touch bar sector 80 with a force in opposition to the spring 88, the switch 90 causes the motor 64 to become energized; which in turn causes the warming units 24 to progress around the track 14. Preferably, the touch bar sectors 80 and the levers 82 are formed of a light-weight, attractively formed plastic material.

A light-weight cover member 92 encloses the track 14, the motor 90, and the other moving internal components of the food warming unit.

It can therefore be seen that I have described in detail an improved self-serving, food warming apparatus, having a plurality of food warming units 24, each of which is provided with means for warming foodstuffs to any desirable temperature, and which are movable from any initial position to a selected position around a closed track 14. The motorized drive permits a substantial combined weight of various foodstuffs to be carried around a predetermined path in response to the depression of any of the peripheral touch bar sectors 80.

Although, I have described only one preferred embodiment of the present invention, various modifications and revisions can be made therein without departing from the spirit of the invention as expressed in the scope of the appended claims.

I claim:
1. A food warming and serving apparatus comprising:
  (a) a base;
  (b) a plurality of hot plates and means mounted on the base supporting the hot plates for movement along a predetermined, closed path, each hot plate having an electrical heating element carried therewith for maintaining a foodstuff supported on the plate at a temperature which is independent of the temperatures of foodstuffs supported on other hot plates;
  (c) electrically conductive track means mounted on the base adjacent the path of movement of the hot plates, said track means being suited for connection to a source of electrical power;
  (d) electrical contact means connected to the heating element of each hot plate and movable therewith along said track, said contact means being slidably engaged with the track means to form an electrical connection between the heating element of each hot plate and the source of electrical power in any position of the plates along said path; and
  (e) drive means connected to at least one of the hot plates for imparting motion to the hot plate along said path toward a station adjacent thereto, and for stopping the motion of said plates when a selected plate is adjacent said station whereby a plurality of different foodstuffs may be supported on the hot plates, each separately maintainable at a warming temperature, and a selected foodstuff moved along said path from a remote station toward a serving station.

2. A food warming and serving apparatus as defined in claim 1, including an elongated support mounted on said base, a supporting bracket attached to each hot plate and mounted on the support such that as the plates are moved along said path, each plate is horizontally advanced along one longitudinal side of the support in a first direction and then along the opposite longitudinal side of the support in the opposite direction.

3. A food warming and serving apparatus as defined in claim 2, in which each bracket has a leg with its hot plate being supported on one end thereof, and roller means on the opposite end supporting the leg on the support.

4. A food warming and serving apparatus as defined in claim 3, including an elongated drive member connected to the inner end of each leg, the drive member being connected to the drive means so as to simultaneously move the hot plates along said path.

5. A food warming and serving apparatus as defined in claim 1, including an elongated touch bar movably mounted on the base parallel to the path of motion of the hot plates, the touch bar being connected to the drive means to selectively energize and de-energize same, to repectively, move and stop movement of the hot plates.

6. A food warming and serving apparatus, comprising:
  (a) a base;
  (b) an elongated supported mounted on the base;
  (c) a plurality of hot plates mounted on the support so as to be movable therearound along a closed, horizontal path, each hot plate having an electrical heating element for maintaining a foodstuff supported on the plate at a temperature which is independent of the temperature of foodstuffs supported on the other hot plates, and independent of the plate's position in said path;

(d) electrical track means mounted on the base adjacent the path of movement of the hot plates, said track means being suited for connection to a source of electrical power;

(e) electrical contact means connected to the heating element of each hot plate and movable therewith along said path, the contact means being engaged with the track means to provide a connection between the source of electrical power and the heating element of each hot plate as it is moved to any position along said path;

(f) drive means mounted on the base and connected for imparting motion thereto along said path toward a station adjacent the path, and for stopping said motion when a selected hot plate is in said station; and (g) touch bar means mounted on the base parallel to the path of motion of the hot plates and connected to the drive means such that a user can control said drive means to either impart to or to stop motion of the hot plates from either of a pair of separated stations adjacent said path.

References Cited

UNITED STATES PATENTS

| | | | |
|---|---|---|---|
| 1,599,556 | 9/1926 | Cook | 99—443 |
| 2,099,247 | 11/1937 | Whitlock | 219—389 |
| 3,019,744 | 2/1962 | Carvel | 99—443 X |

BERNARD A. GILHEANY, Primary Examiner

H. B. GILSON, Assistant Examiner

U.S. Cl. X.R.

99—443; 219—389